March 24, 1931. J. P. NIELSEN Re. 18,008

ELECTRIC LAMP SOCKET CIRCUIT INTERRUPTER

Original Filed Sept. 22, 1923

INVENTOR
JENS P. NIELSON
BY Charles S. Evans
HIS ATTORNEY.

Reissued Mar. 24, 1931

Re. 18,008

UNITED STATES PATENT OFFICE

JENS P. NIELSEN, OF NEW YORK, N. Y., ASSIGNOR, BY MESNE ASSIGNMENTS, TO HORACE HILLS, INC., OF RENO, NEVADA, A CORPORATION OF NEVADA

ELECTRIC-LAMP-SOCKET CIRCUIT INTERRUPTER

Original No. 1,554,753, dated September 22, 1925, Serial No. 664,193, filed September 22, 1923. Application for reissue filed January 15, 1927. Serial No. 161,455.

One of the objects of the invention is to prevent the surreptitious and unauthorized use of electric currents by persons occupying rooms or other quarters which are electrically lighted. It is a common practice to remove the electric lamp and plug in a heater, curling iron and other appliance consuming current thereby adding materially to the running expense of a hotel, rooming house and the like.

Another object of the invention is the provision of a wafer or body adapted to be removably positioned in an electric lamp socket between the center contacts of the socket and the lamp plugged therein, and which embodies an interrupter element for the control of current supplied to the socket.

Another object of the invention is the provision of improved means for the mounting of an interrupter element to control or affect the current supplied to a lamp socket.

One of the forms which the interrupter element within the wafer may take is that of a fuse wire, and if such an interrupter element is mounted in a wafer or plate in accordance with the present embodiment of my invention, and the wafer introduced into an ordinary lamp socket, the fuse will "blow" or melt and interrupt or break the circuit when any appliance requiring a heavy current consumption is plugged into the socket after the lamp has been removed, said fuse being concealed within the socket and not readily renewable by the uninitiated.

It is apparent that my interrupter may be in various forms, since my mounting is adapted to support interrupters of various forms, for example, like those shown in patents to Ryan, No. 1,121,292, Hay, No. 1,283,751, Hewitt et al. No. 851,420, Reeve, No. 269,960, Shoenberg, No. 1,400,914 and Spencer, No. 1,448,240.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Corresponding and like parts are referred to in the following description and designated in the several views of the drawings by like reference characters.

Figure 1:
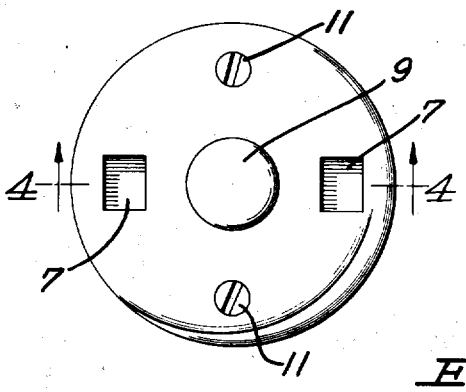
Figure 1 is a plan view of a wafer fuse embodying the invention.
Figure 2:
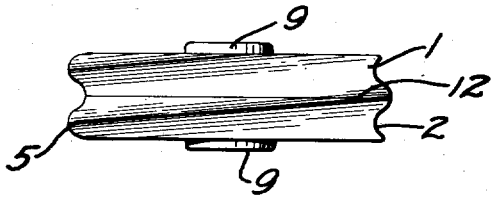
Figure 2 is an edge view thereof.
Figure 3:
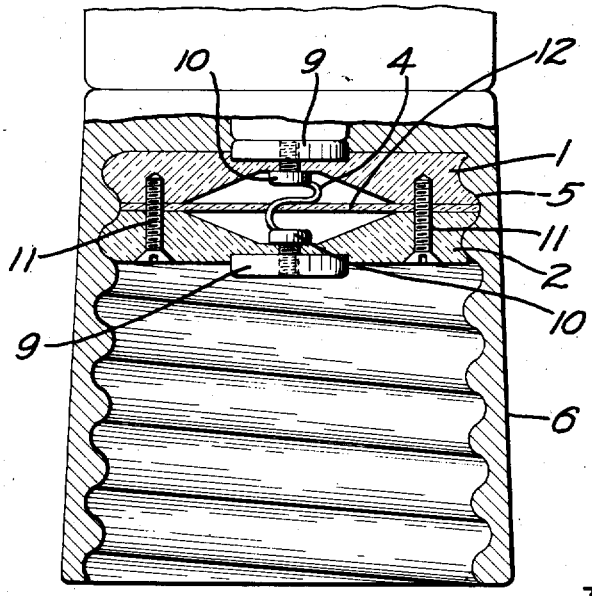
Figure 3 is a sectional view of the fuse showing it applied to a lamp socket.
Figure 5:
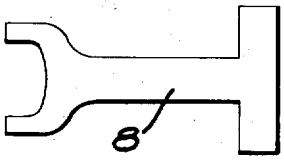
Figure 5 is a detail view of a key for rotating the fuse when placing it in position or removing it from the socket.
Figure 4:
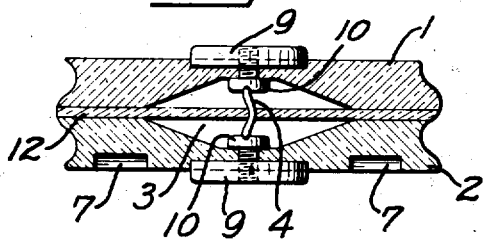
Figure 4 is a sectional view on the line 4—4 of Figure 1.

The body of the device is of flattened form suggestive of a wafer and is constructed of insulating material such as fiber, rubber or composition, and for convenience comprises similar or like plates or body sections 1 and 2 between which is formed a central space 3 which contains an interrupter element such as a fuse wire 4 approximating one ampere capacity and which will blow when a current is passing of greater capacity than required for an electric lamp. The inner or opposing faces of the sections 1 and 2 are recessed to form the space 3. The outer edge of the fuse is formed with screw threads 5 to match the screw threads of an ordinary lamp socket 6. Openings 7 are provided in a side of the fuse to receive the nib of a key 8 which is required to rotate the fuse when placing the same in position or removing it from the socket. Centrally disposed contacts 9 are provided at opposite sides of the fuse and may be held in place by any suitable means such as screws 10, the latter also serving as means for securing the ends of the fuse wire 4. The two sections 1 and 2 may be held when assembled by any suitable means, such as screws 11, the latter admitting of replacing the fuse wire 4 when blown, so that the fuse may be repeatedly used.

To prevent arcing between the contacts after the fuse blows, any fuse filler may occupy the space 3, or a sheet of mica 12 may be clamped between the sections 1 and 2 and have an opening for the passage of the fuse wire 4. The opening in the mica 12 is out of line with the contacts to prevent the formation of a direct passage for the current.

I claim:

1. In combination with an electric lamp socket, a fuse disposed in the socket and consisting of two wafers having matching recesses therein together forming a central space, a fuse element bridging said space, terminals on the wafers and connected with said fuse elements, and the margin of said wafers formed with screw threads to engage the screw threads of the socket.

2. In combination with an electric lamp socket, a fuse disposed in the socket and occupying a minimum amount of the space thereof, said fuse being of a capacity to blow upon attempted consumption of current heavier than that required for the lamp normally occupying the socket, the fuse having wafers provided with marginal screw threads to engage the screw threads of the socket, the fuse having an internal space, a diaphragm of insulation bridging said space, a fuse element carried by the fuse, and said element passing through the diaphragm in disalinement with its terminals for the purpose specified.

3. In combination with an electric lamp socket, a fuse disposed in the socket and occupying a minimum amount of the space thereof, said fuse being of a capacity to blow upon attempted consumption of current heavier than that required for the lamp normally occupying the socket, the fuse consisting of disks having their inner surfaces cut away to provide a space, a diaphragm of insulation bridging said space, means securing the disks together and said diaphragm between them, terminals on the disks, a fuse element extending from one terminal to the other terminal, and said element passing through the diaphragm in disalinement with the axis of its terminals.

4. A device of the class described adapted to be removably inserted within a lamp socket, comprising a rigid disk having a space therein within its periphery, an interrupter element disposed within and occupying a portion of the space, and contacts on opposite sides of the disk connected to the interrupter element.

5. A circuit interrupter adapted to be removably inserted within a lamp socket, comprising a rigid disk with a portion removed therefrom at a point spaced inwardly from its periphery, an interrupter element positioned in a portion of the space thus provided, and contacts on opposite sides of the disk connected to the interrupter element.

6. A circuit interrupter adapted to be removably positioned in a lamp socket and comprising a pair of rigid plates fixed together and having a space therebetween spaced inwardly from the periphery thereof, an interrupter element disposed within said space for interrupting current supplied to the socket, and contacts on the external faces of said plates electrically connected to said element.

7. A mounting for an interrupter element adapted to affect the current supplied to an electric socket, comprising a rigid disk adapted to be removably positioned within the socket, and having a free space therein in part of which the interrupter element may be disposed.

8. A mounting for an interrupter element adapted to affect the current supplied to an electric socket, comprising a rigid disk adapted to be removably positioned within the socket, and having a free space therein within the periphery of the disk and in which the interrupter element may be disposed.

9. A mounting for an interrupter element adapted to affect the current supplied to an electric socket, comprising a pair of rigid members secured together to form a housing adapted to be removably inserted within the socket and having a space between the members in which the interrupter element may be disposed.

In testimony whereof, I have hereunto set my hand this 5th day of January, 1927.

JENS P. NIELSEN.